United States Patent
Kumar et al.

(10) Patent No.: US 12,192,944 B2
(45) Date of Patent: Jan. 7, 2025

(54) METHOD AND SYSTEMS FOR RECEIVING INCOMING SERVICE NOTIFICATION FOR SECOND SIM NETWORK USING FIRST SIM NETWORK

(71) Applicant: Samsung Electronics Co., Ltd., Suwon-si (KR)

(72) Inventors: Lalith Kumar, Bengaluru (IN); Kailash Kumar Jha, Bengaluru (IN); Alok Kumar Jangid, Bengaluru (IN); Swapnil Santosh Nivendkar, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 17/594,824

(22) PCT Filed: Apr. 29, 2020

(86) PCT No.: PCT/KR2020/005681
§ 371 (c)(1),
(2) Date: Oct. 29, 2021

(87) PCT Pub. No.: WO2020/222531
PCT Pub. Date: Nov. 5, 2020

(65) Prior Publication Data
US 2022/0210756 A1 Jun. 30, 2022

(30) Foreign Application Priority Data

Apr. 30, 2019 (IN) .............................. 201941017245
Apr. 27, 2020 (IN) .............................. 201941017245

(51) Int. Cl.
*H04W 76/12* (2018.01)
*H04W 8/18* (2009.01)
*H04W 60/00* (2009.01)
*H04W 88/06* (2009.01)

(52) U.S. Cl.
CPC .......... *H04W 60/005* (2013.01); *H04W 8/18* (2013.01); *H04W 76/12* (2018.02); *H04W 88/06* (2013.01)

(58) Field of Classification Search
CPC .... H04W 60/005; H04W 76/12; H04W 88/06
See application file for complete search history.

(56) References Cited

U.S. PATENT DOCUMENTS 7,212,506 B2   5/2007 Varney et al.
9,338,713 B2   5/2016 Chakravarthy et al.
(Continued)

FOREIGN PATENT DOCUMENTS

CN       103460756 A    12/2013
KR       20160065143 A   6/2016

OTHER PUBLICATIONS

International Search Report and Written Opinion of the International Searching Authority in connection with International Application No. PCT/KR2020/005681 issued Aug. 6, 2020, 10 pages.
(Continued)

*Primary Examiner* — Rasha S Al Aubaidi
*Assistant Examiner* — Jirapon Tulop

(57) ABSTRACT

A method of communication in a multi-Subscriber Identity Module (SIM) enabled User Equipment (UE) is disclosed. The method includes registering the UE with a network of a first SIM, establishing a secure communication tunnel between the UE and the network of the first SIM, and establishing a connection between the UE and a network of a second SIM through the secure communication tunnel established between the UE and the network of the first SIM. The method includes registering the UE with the network of the second SIM, upon establishment of the connection between the UE and the network of the second SIM. The (Continued)

method includes initiating a request to indicate a downlink service pending at the network of the second SIM.

18 Claims, 16 Drawing Sheets

(56) References Cited

U.S. PATENT DOCUMENTS

| | | | |
|---|---|---|---|
| 2014/0044099 A1 | 2/2014 | Sfar | |
| 2016/0088645 A1 | 3/2016 | Burhan et al. | |
| 2016/0262200 A1* | 9/2016 | Su | H04W 52/0209 |
| 2017/0150545 A1* | 5/2017 | Ramkumar | H04W 8/082 |
| 2019/0090309 A1* | 3/2019 | Wong | H04W 92/02 |

OTHER PUBLICATIONS

SA WG2, "New SID: Study on system enablers for multi-SIM devices", TSG SA Meeting #SP-82, Dec. 12-14, 2018, SP-181251, 4 pages.

SA WG2, "Revised SID: Study on system enablers for multi-SIM devices", TSG SA Meeting #SP-83, Mar. 20-22, 2019, SP-190248, 4 pages.

LG Electronics, "Support for paging reception for UE with Multiple SIMs", 3GPP TSG-SA WG Meeting #86, May 6-10, 2019, S1-191073 (was xxx), 3 pages.

Supplementary European Search Report dated Apr. 28, 2022 in connection with European Patent Application No. 20 79 8518, 11 pages.

Intellectual Property India, "Subsequent Examination report under sections 12 & 13 of the Patents Act," dated Nov. 23, 2021, in connection with Indian Patent Application No. 201941017245, 2 pages.

Intellectual Property India, "Examination report under sections 12 & 13 of the Patents Act," dated Jul. 2, 2021, in connection with Indian Patent Application No. 201941017245, 7 pages.

The First Office Action dated Mar. 26, 2024, in connection with Chinese Patent Application No. 202080032801.X, 15 pages.

Communication under Rule 71(3) EPC dated Jul. 17, 2024, in connection with European Patent Application No. 20798518.5, 42 pages.

* cited by examiner

METHOD AND SYSTEMS FOR RECEIVING INCOMING SERVICE NOTIFICATION FOR SECOND SIM NETWORK USING FIRST SIM NETWORK

CROSS-REFERENCE TO RELATED APPLICATIONS

This application is a 371 of International Application No. PCT/KR2020/005681, filed Apr. 29, 2020, which claims priority to Indian Provisional Patent Application No. 201941017245 filed Apr. 30, 2019, and Indian Non-Provisional Patent Application No. 201941017245, filed Apr. 27, 2020, the disclosures of which are herein incorporated by reference in their entirety.

BACKGROUND

1. Field

The present disclosure relates to wireless communication and in particular, relates to methods and systems for communication in a multi-Subscriber Identity Module (SIM) user equipment.

2. Description of Related Art

Nowadays, communication devices have become an inseparable part of our lives. In fact, with the advent of technology, a communication device has become a one-point solution for a lot of routine matters. As is generally known, a cellular device includes the equipment and a Subscriber Identity Module (SIM) providing a unique contact number to a corresponding user. In the past decade, cellular devices having multiple SIM cards have gained quite some popularity.

Particularly, dual-SIM cellular devices have become quite common for users. This is mainly because the provision of multiple SIM cards in the equipment allows the user to subscribe to multiple networks at one time. Therefore, in case one of the networks does not have any coverage in a particular geographical area, the user has the option of switching to other network which has the coverage in that area. This proves to be a great convenience for the user in routine matters.

However, there are certain limitations associated with multi-SIM applications in a cellular device. One of the prominent concerns is that when a User Equipment (UE) is in active communication with SIM 1, for example, through a Voice Over Long-Term Evolution (VoLTE) call, the UE may not be able to monitor paging on SIM 2.

SUMMARY

This technical solution is provided to introduce a selection of concepts, in a simplified format, that are further described in the mode for invention. This technical solution is neither intended to identify key or essential inventive concepts of the disclosure and nor is intended for determining the scope of the disclosure.

In an embodiment of the present disclosure, a method of communication in a multi-Subscriber Identity Module (SIM) enabled User Equipment (UE) is disclosed. The method includes registering the UE with a network of a first SIM. The method includes establishing a secure communication tunnel between the UE and the network of the first SIM. The method includes establishing a connection between the UE and a network of a second SIM through the secure communication tunnel established between the UE and the network of the first SIM. The method includes registering the UE with the network of the second SIM, upon establishment of the connection between the UE and the network of the second SIM. The method includes initiating a request to indicate a downlink service pending at the network of the second SIM.

In another embodiment of the present disclosure, a system for communication in a multi-SIM enabled UE is disclosed. The system includes a registering module configured to register the UE with a network of a first SIM. The system includes an establishing module in communication with the registering module and configured to establish a secure communication tunnel between the UE and the network of the first SIM. The establishing module is configured to establish a connection between the UE and a network of a second SIM through the secure communication tunnel established between the UE and the network of the first SIM. The system includes a registering module in communication with the establishing module, and configured to register the UE with the network of the second SIM, upon establishment of the connection between the UE and the network of the second SIM. The system also includes a requesting module in communication with the establishing module and configured to initiate a request for indicating a downlink service pending at the network of the second SIM.

In another embodiment of the present disclosure, a multi-Subscriber Identity Module (SIM) enabled user equipment (UE) is disclosed. The UE includes a first stack configured to accommodate a first SIM, a second stack configured to accommodate a second SIM, and a system in communication with the first SIM and the second SIM. The system is configured to register the UE with a network of a first SIM, and establish a secure communication tunnel between the UE and the network of the first SIM. The system is configured to establish a connection between the UE and a network of the second SIM through the secure communication tunnel established between the UE and the network of the first SIM. The system is configured to register the UE with the network of the second SIM, upon establishment of the connection between the UE and the network of the second SIM. The system is configured to initiate a request to indicate a downlink service pending at the network of the second SIM.

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the present disclosure will become better understood when the following mode for invention is read with reference to the accompanying drawings in which like characters represent like parts throughout the drawings, wherein.

Figure 1:
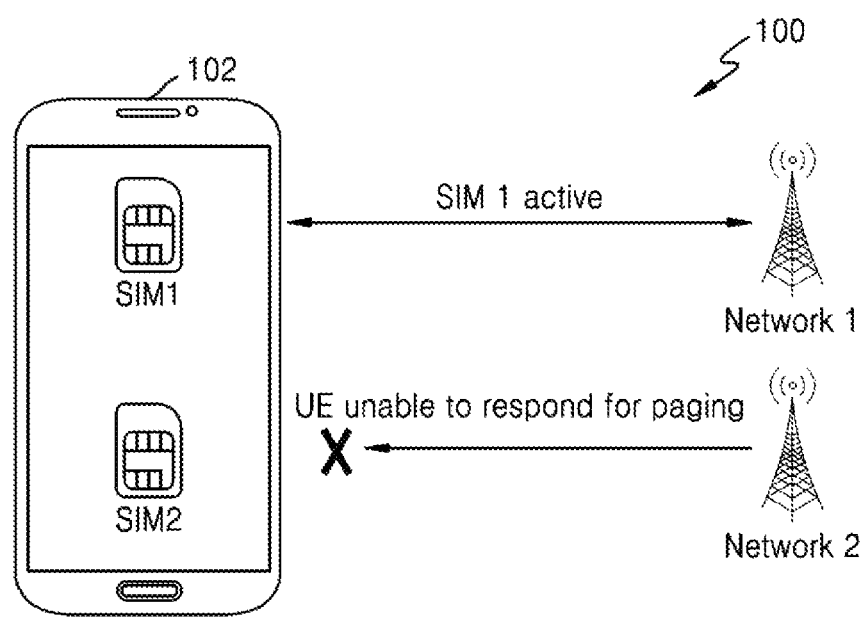
FIG. 1 illustrates a line diagram depicting a dual-SIM UE interacting with networks of SIM1 and SIM 2, according to one or more of existing techniques.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present invention will be described below in detail with reference to the accompanying drawings.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2.

FIG. 1 illustrates a line diagram 100 depicting a dual-SIM UE 102 interacting with networks of SIM1 and SIM 2, according to one or more of existing techniques. As illustrated, when the UE 102 is in active communication with the network of SIM 1, the UE 102 cannot monitor paging on SIM 2. As is generally known, paging is a mechanism used in communication devices, whereby a network notifies the UE 102 of a request to establish a connection with the UE 102. For example, the request may be received from another UE. The UE 102 may then decode the content of the paging notification to accordingly initiate the suitable procedure.

Now, when SIM 1 is active and SIM 2 is continuously paging the UE 102, it has to be decided whether the paging has to be responded to or not. Further, in the absence of a service that triggered the paging, the UE 102 has to decide if it has to respond to the paging without the adequate information. Moreover, when the UE 102 decides to respond to the paging from SIM2, the UE 102 may terminate the ongoing activity through SIM 1. In case the ongoing activity is not terminated, it may be interpreted as an error in the operation of SIM 1.

On the other hand, if the UE 102 attempts to monitor paging on SIM2 during active communication through SIM 1, a significant degradation in performance of operation of SIM 1 is witnessed. For example, when SIM 1 is actively communicating, any interruptions, such as period monitoring of paging of SIM2, may cause data loss which in turn would affect the performance of SIM 1 as well.

Figure 2:
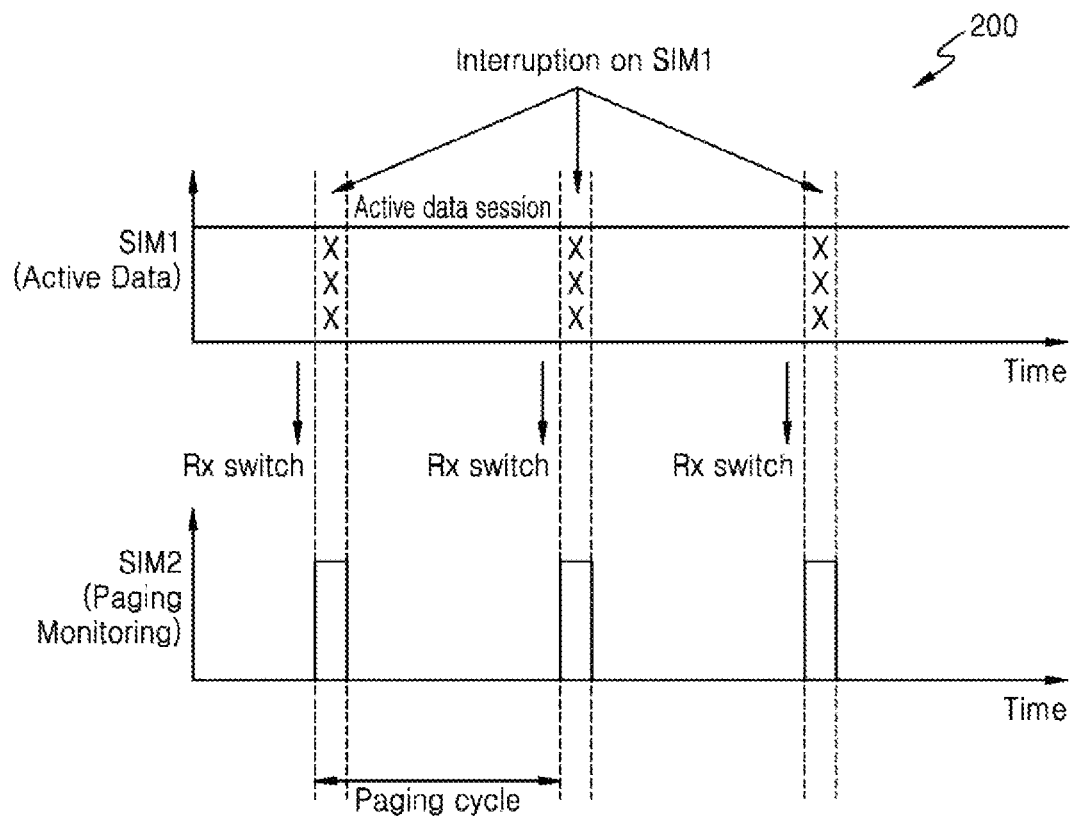
FIG. 2 illustrates a line diagram depicting a schematic view of data loss during operation of SIM 1, when the UE attempts to monitor paging on SIM 2, according to one or more of the existing prior arts.

FIG. 2 illustrates a line diagram 200 depicting a schematic view of data loss during the operation of SIM 1, when the UE 102 attempts to monitor paging on SIM 2, according to one or more of the existing techniques. The reference number 202 indicates a period in which SIM 2 is being monitored. Further, the reference number 204 indicates a loss of data during the operation of SIM1 owing to the monitoring of SIM2. As is evident, in the period of monitoring of SIM 2, a data loss is witnessed during the operation of SIM 1, for example, due to Rx tune on SIM 2 for monitoring the paging.

Moreover, considering that there are two SIMS in the UE 102, at any given time, paging on one of the SIMs would need to be monitored. This would frequently drain a battery of the UE, which eventually would result in rapid degradation of the performance of the battery as well over a long duration of usage.

Figure 3:
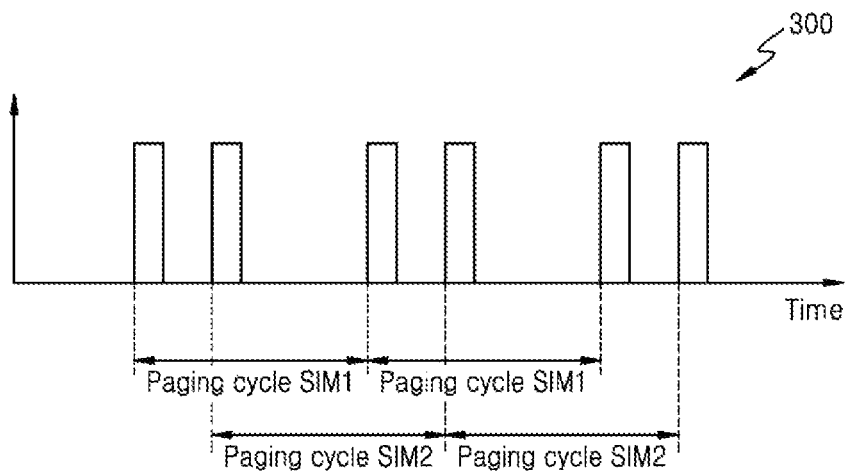
FIG. 3 illustrates a line diagram depicting a pattern of battery consumption during periodic monitoring of paging on both SIMS, according to one or more of the existing techniques.

FIG. 3 illustrates a graph 300 depicting a pattern of battery consumption during periodic monitoring of paging on both SIMS, according to one or more of the existing techniques. As illustrated, the available charge in the battery is continuously consumed in order to monitor paging on both SIMS.

Moreover, in an example, a Proxy-Call Session Control Function (P-CSCF) may support Paging Policy Differentiation by marking packets to be sent towards the UE 102. The packets may relate to specific Instant Messaging Services (IMS), for example, conversational voice as defined in IMS multimedia telephony service. In such an example, a downlink data notification may be sent with a paging priority indication to a Mobility Management Entity (MME). Now, in an example, while waiting for a response from the UE 102 to a paging request message sent with the paging priority indication, the MME may receive another downlink data notification with a high paging priority. In such instances, the MME does not abort on-going paging process and therefore, the UE 102 will not receive the high priority paging request.

Figure 4:
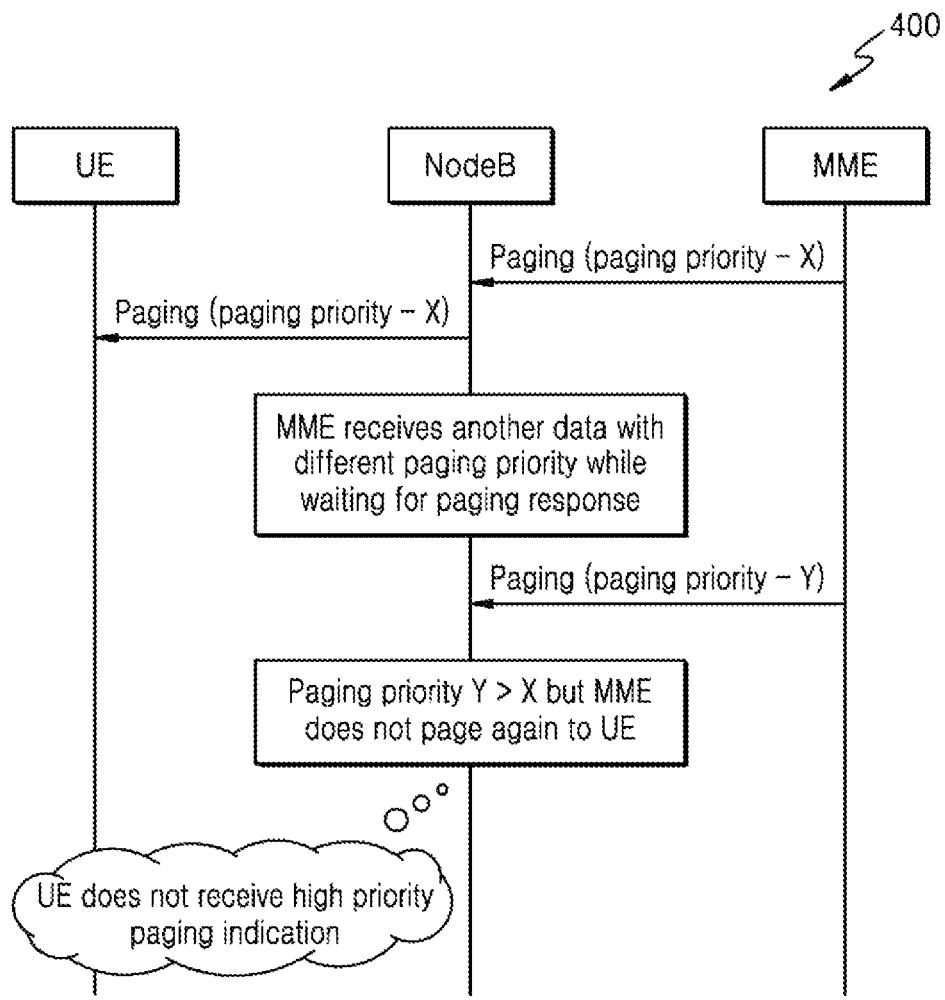
FIG. 4 illustrates a call flow diagram depicting handling of paging requests having different priorities, according to one or more of the existing techniques.

FIG. 4 illustrates a call flow diagram 400 depicting handling of paging requests having different priorities, according to one or more of the existing techniques. As illustrated, a nodeB receives a paging request having a priority of "X" from the MME. The nodeB forwards the paging request to the UE 102. While waiting for a response to the paging request from the UE 102, the nodeB receives another paging request with a priority "Y". The priority "Y" is higher than the priority "X". However, since the nodeB is still awaiting the response to the first paging request, the MME does not again page to the UE 102 with regard to the paging request having the priority "Y". Therefore, the UE 102 does not receive the high priority paging indication.

As would be gathered, there exists a need for a solution ensuring enhanced communication in multi-SIM cellular devices while overcoming one or more of the abovementioned problems.

Figure 5:
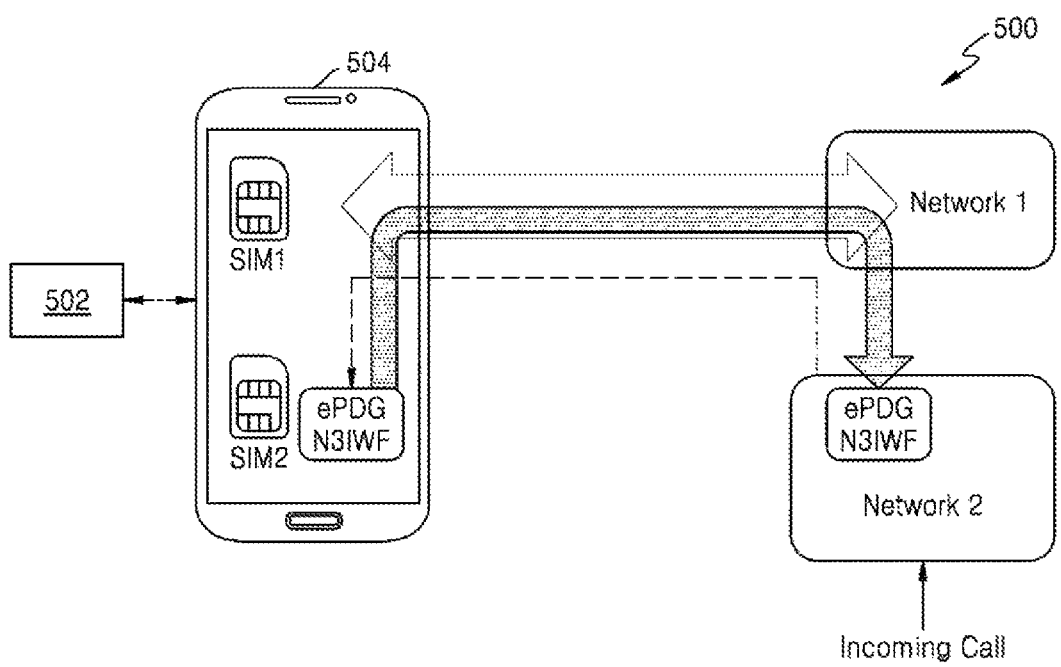
FIG. 5 illustrates an environment depicting implementation of a system for communication in a multi-Subscriber Identity Module (SIM) enabled User Equipment (UE), according to an embodiment of the present disclosure.

FIG. 5 illustrates an environment 500 depicting implementation of a system 502 for communication in a multi-Subscriber Identity Module (SIM) enabled User Equipment (UE) 504, according to an embodiment of the present disclosure. In an embodiment, a UE 504 may be embodied as any communication device having at least two SIMS. The UE 504 may include, but is not limited to, a smartphone, a tablet, and a personal digital assistant (PDA).

In an embodiment, the UE 504 may include a stack for accommodating each SIM. In the present disclosure, for the sake of simplicity and ease of explanation, the constructional and operational features of the UE 504 and the system 502 are explained from the perspective of a pair of SIMS, namely, a first SIM or SIM 1 and a second SIM or SIM 2. However, it would be appreciated by a person skilled in the art that the present disclosure is equally applicable to UEs having more than two SIMS, without departing from the scope of the present disclosure.

In an embodiment with dual SIMS, the UE 504 may include a first stack (not shown) and a second stack (not shown) configured to accommodate the first SIM and the second SIM, respectively. Therefore, the UE 504 is configured to communicate with a network of the first SIM and a network of the second SIM. In the illustrated embodiment, the network of the first SIM is shown as network 1, and the network of the second SIM is shown as network 2. Further, the UE 504 may also include the system 502 in communication with the first SIM and the second SIM. The system 502 is configured to facilitate an enhanced communication of the UE 504 with the networks of the first SIM and the second SIM. Constructional and operational features of the system 502 are explained in detail in the description of FIG. 6.

Figure 6:
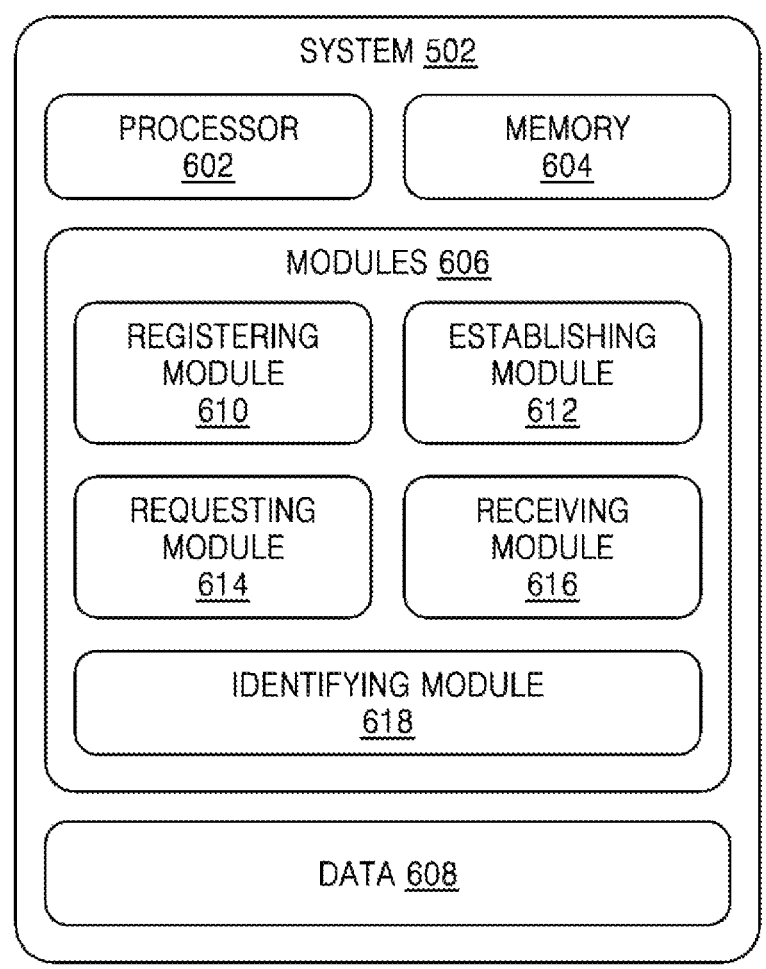
FIG. 6 illustrates a block diagram of the system, according to an embodiment of the present disclosure.

FIG. 6 illustrates a block diagram of the system 502, according to an embodiment of the present disclosure. In an embodiment, the system 502 may be implemented within the UE 504. In another embodiment, the system 502 may be implemented in a server in communication with the UE 504.

In an embodiment, the system 502 may include, but is not limited to, a processor 602, memory 604, modules 606, and data 608. The modules 606 and the memory 604 may be coupled to the processor 602. The processor 602 can be a single processing unit or a number of units, all of which could include multiple computing units. The processor 602 may be implemented as one or more microprocessors, microcomputers, microcontrollers, digital signal processors, central processing units, state machines, logic circuitries, and/or any devices that manipulate signals based on operational instructions. Among other capabilities, the processor 602 is configured to fetch and execute computer-readable instructions and data stored in the memory 604.

The memory 604 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules 606, amongst other things, include routines, programs, objects, components, data structures, etc., which perform particular tasks or implement data types. The modules 606 may also be implemented as, signal processor(s), state machine(s), logic circuitries, and/or any other device or component that manipulate signals based on operational instructions.

Further, the modules 606 can be implemented in hardware, instructions executed by a processing unit, or by a combination thereof. The processing unit can comprise a computer, a processor, such as the processor 602, a state machine, a logic array or any other suitable devices capable of processing instructions. The processing unit can be a general-purpose processor which executes instructions to cause the general-purpose processor to perform the required tasks or, the processing unit can be dedicated to perform the required functions. In another embodiment of the present disclosure, the modules 606 may be machine-readable instructions (software) which, when executed by a processor/processing unit, perform any of the described functionalities.

In an embodiment, the modules 606 may include a registering module 610, an establishing module 612, a requesting module 614, a receiving module 616, and an identifying module 618. The registering module 610, the establishing module 612, the requesting module 614, the receiving module 616, and the identifying module 618 may be in communication with each other. The data 608 serves, amongst other things, as a repository for storing data processed, received, and generated by one or more of the modules 606.

Referring to FIG. 5 and FIG. 6, in an embodiment, the registering module 610 may be configured to register the UE 504 with a network of the first SIM. The registering module 610 may be in communication with the establishing module 612. The establishing module 612 may be configured to establish a secure communication tunnel between the UE 504 and the network of the first SIM.

In an embodiment, the establishing module 612 may be configured to establish a Protocol Data Unit (PDU) session between the UE 504 and the network of the first SIM. In an embodiment, the PDU session may be established over 3GPP access of the network of the first SIM. The establishing module 612 may then be configured to establish the secure communication tunnel between the UE 504 and the network of the first SIM through the PDU session.

The establishing module 612 may further be configured to establish secure communication between the UE 504 and the network of the second SIM through the secure communication tunnel established between the UE 504 and the network of the first SIM. In an embodiment, the establishing module 612 may be configured to establish the secure communication between the UE 504 and the network of the second SIM through one of an evolved Packet Data Gateway (ePDG) and a Non-3GPP Inter-working Function (N3IWF). In an embodiment, the ePDG or the N3IWF of the second network is connected to the secure communication tunnel established between the UE 504 and the network of the first SIM.

Over the secure communication established between the UE 504 and the network of the second SIM, the establishing module 612 may be configured to establish a connection with the network of the second SIM. Upon the establishment of the connection between the UE 504 and the network of the second SIM, the registration module 610 may be configured to register the UE 504 with the network of the second SIM.

In an embodiment, the registering module 610 and the establishing module 612 may be in communication with the requesting module 614. The requesting module 614 may be configured to initiate a request for indicating a downlink service pending at the network of the second SIM. In an embodiment, the registering module 610 may be in communication with the receiving module 616. The receiving module 616 may be configured to receive a Non-Access Stratum (NAS) message from the network of the first SIM. The NAS message may be indicative of at least one pending downlink service at the network of the second SIM. The NAS message may be received over the secure communication between the UE 504 and the network of the second SIM. Therefore, the UE 504 would notify of any pending downlink service at the network of the second SIM through the secure communication tunnel between the UE 504 and the first SIM. The system 502 does not use broadcast paging procedure using Radio Access Network (RAN) of the second SIM. Further, the receiving module 616 may be in communication with the identifying module 618.

The identifying module 618 may be configured to identify a priority of a pending downlink service notified to the UE 504 through the NAS message. In an embodiment, the priority may be identified based on predefined priorities of downlink services. Based on the identified priority of the pending downlink service, the establishing module 612 may be configured to execute an action with regard to responding to the pending downlink service.

In an embodiment, when the pending downlink service is of high importance, the establishing module 612 may terminate an active session between the UE 504 and the network of the first SIM. Subsequently, the establishing module 612 may establish an active session between the UE 504 and the network of the second SIM.

In an alternate embodiment, when the downlink service is of low priority, the establishing module 612 may transmit a notification to the network of the second SIM. The notification may be an indication that an action is not initiated for the downlink service, owing to the low priority. Therefore, the active session between the UE 504 and the first SIM is continued.

Figure 7:
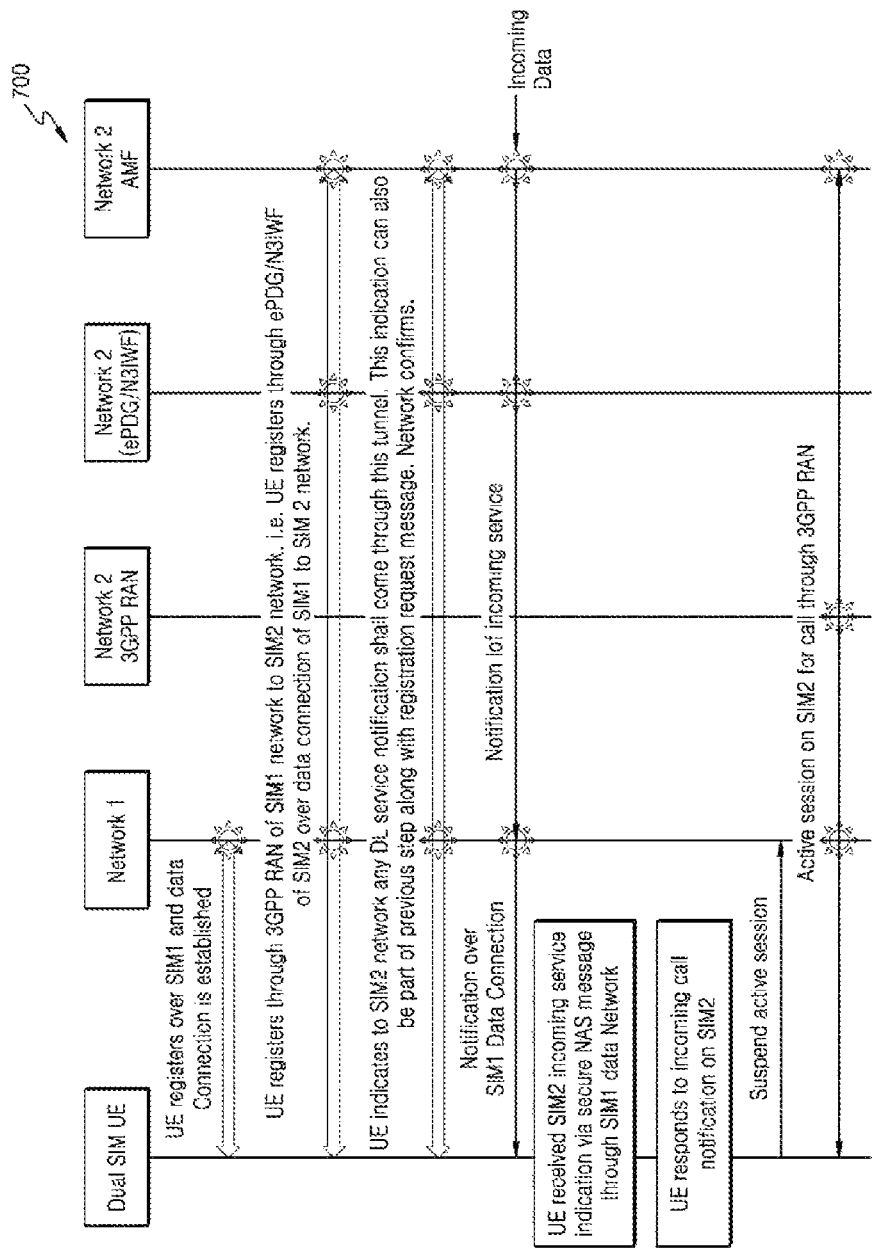
FIG. 7 illustrates a call flow diagram depicting the operation of the system for communicating with networks of SIMS for enhanced communication, according to an embodiment of the present disclosure.

FIG. 7 illustrates a call flow diagram 700 depicting the operation of the system 502 for communicating with the networks of the first SIM and the second SIM for enhanced communication, according to an embodiment of the present disclosure. For the sake of brevity, constructional and operational features of the present disclosure that are already explained in the description of FIG. 5 and FIG. 6 are not explained in detail in the description of FIG. 7.

In an embodiment, the UE 504 registers over SIM 1, PDU session is established, and therefore, a data connection is established. The UE 504 registers through ePDG/N3IWF to Access and Mobility Management Function (AMF) of SIM 2 over the data connection of SIM 1, i.e., the secure tunnel. In an embodiment, the UE 504 may register through ePDG/N3IWF to the AMF for SIM 2 Network for Instant Messaging Services (IMS), such as calls and SMS. Upon receiving an incoming request, the Network 2 sends a call indication notification (E.g IP packet or notification) to the Network 1 over the secure tunnel. Subsequently, the Network 1 sends the call indication notification (E.g IP packet or Notification) to the UE 504. Therefore, the UE 504 may receive the incoming call indication through the N3WIF. Further, the IMS may be for any downlink service (i.e. of any downlink signalling or data packet) which needs to be delivered to the UE 504.

Further, the UE 504 checks whether the incoming request is important based on the predefined priorities. The incoming Service notification may include at least one of a PDU session identifier (ID), a slice ID, a Quality Of Service (QOS), a QoS Class Identifier (QCI), a paging cause, a service type, an Evolved Packet System (EPS) bearer ID, a Data Network Name (DNN), an Access Point Name (APN), a Dedicated Radio Bearer (DRB) ID, a QoS Flow ID (QFI), Traffic flow templates (TFT), an Application ID, a UE Route selection policy identifier, an establishment cause, an access type, and an access category. These Incoming Service notification parameters indicate the type of service pending with the UE 504.

Accordingly, the UE 504 responds to the incoming request. In an embodiment, before responding to the incoming request, the UE 504 may terminate the active session with the Network 1 and then establish an active connection with the Network 2, for high priority incoming request.

Figure 8:
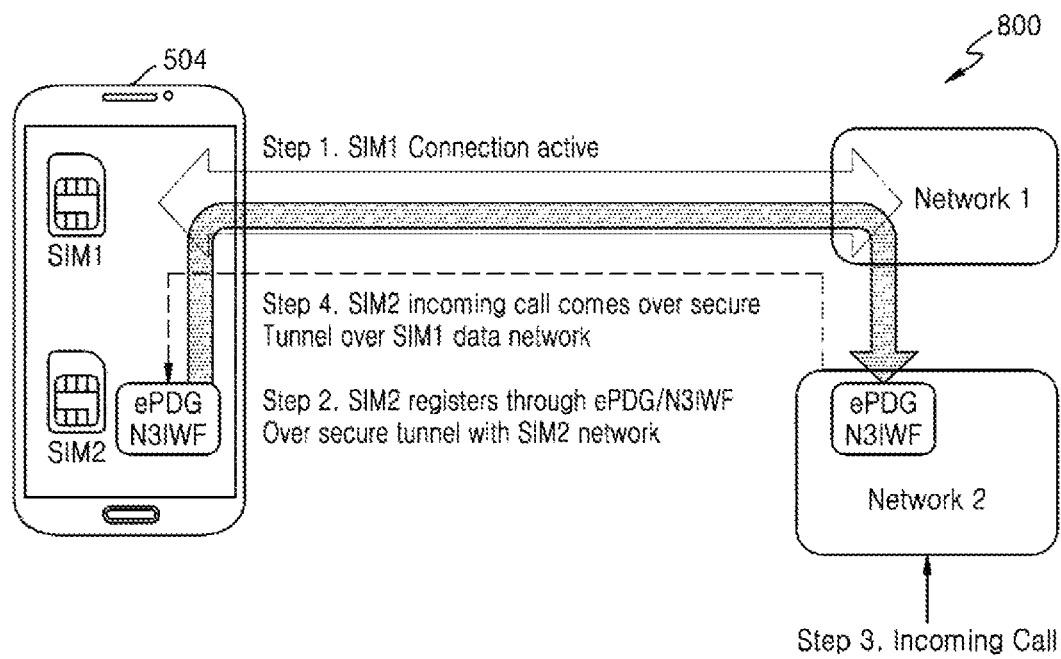
FIG. 8 illustrates a block diagram depicting indication of incoming request through data packets over a secure tunnel, according to an embodiment of the present disclosure.

FIG. 8 illustrates a block diagram 800 depicting indication of incoming request through data packets over a secure tunnel, according to an embodiment of the present disclosure. As illustrated, at a step 1, the UE 504 is in a state of active connection with the Network 1 of the SIM 1. In an embodiment, the state of active connection may include, but is not limited to, a data session. At a step 2, the SIM 2 registers through ePDG/N3IWF over the secure tunnel with SIM 2 Network Further, at a Step 3, an incoming call is received by the Network 2 of SIM 2. At a step 4, the network 2 sends a notification indicative of the incoming call to the UE 504 over the secure tunnel of SIM 1 data network.

Figure 9:
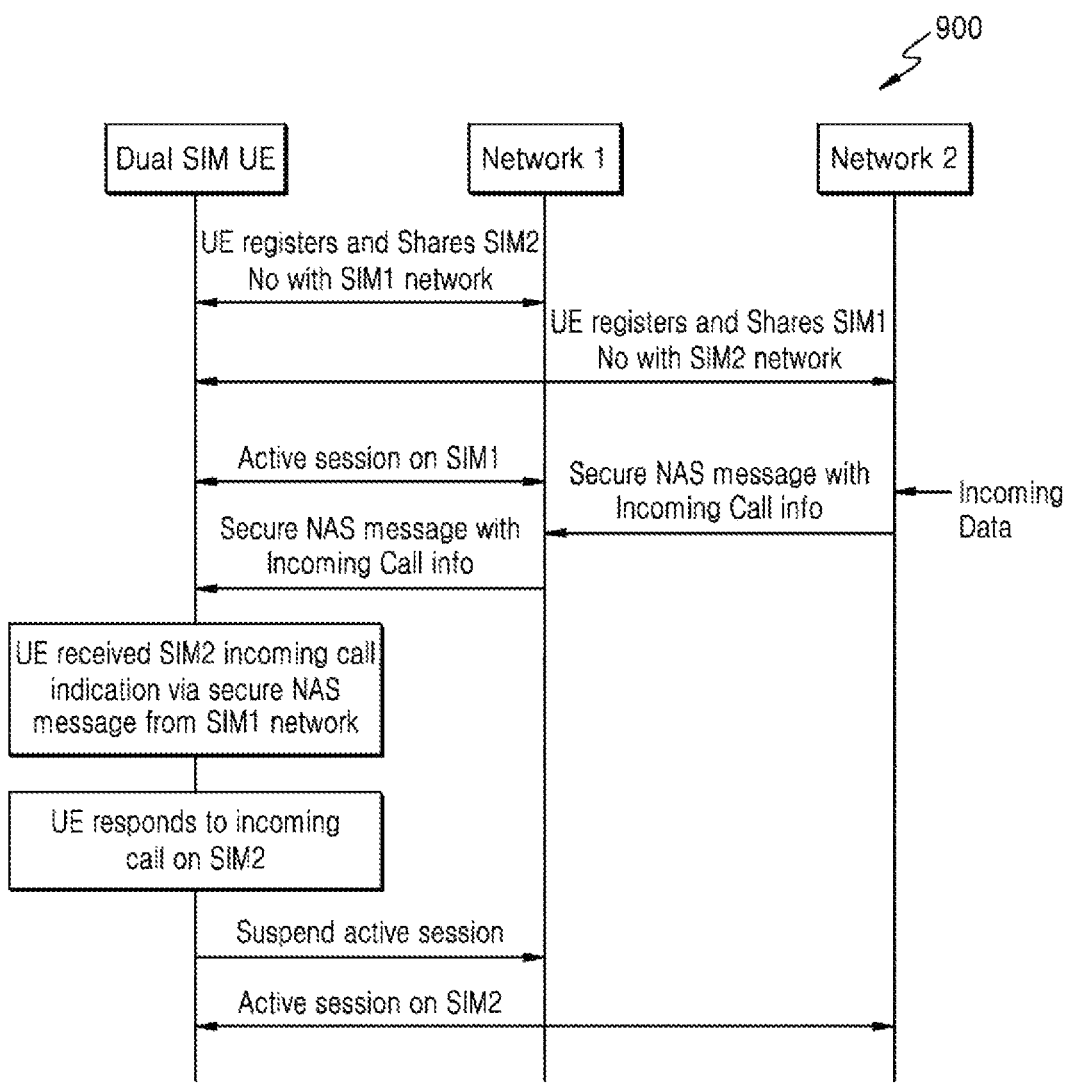
FIG. 9 illustrates a call flow diagram depicting the indication of the incoming request through the data packets over the secure tunnel, according to an embodiment of the present disclosure.

FIG. 9 illustrates a call flow diagram 900 depicting indication of the incoming request through the data packets over the secure tunnel, according to an embodiment of the present disclosure. For the sake of brevity, constructional and operational features of the present disclosure that are already explained in the description of FIG. 5, FIG. 6, FIG. 7, and FIG. 8 are not explained in detail in the description of FIG. 9.

In an embodiment, when the UE 504 completes normal registration of SIM 1, the UE 504 also informs the Network 1 about the contact number of SIM 2, such as Generic Public Subscription Identifier (GPSI), Mobile Station International Subscriber Directory Number (MSISDN) or any other UE identifier. Similarly, during registration of SIM 2, the UE 504 informs the Network 2 about the contact number of SIM 1 (i.e. UE identifier).

Once registered, the UE 504 establishes an active session with SIM 1. Now, during the active session of the UE 504 with SIM 1, an incoming request is received by the Network 2 of SIM 2. The Network 2 sends a notification to the Network 1 informing about the incoming request. The notification is sent through the secure communication tunnel between the UE 504 and the Network 1. In an embodiment, the notification may be sent through a secure NAS message, for example, through Short Messaging Service (SMS) or any other NAS or AS message. The notification may include at least one of the PDU session identifier (ID), the slice ID, the QOS, the QCI, the paging cause, the service type, the EPS bearer ID, the DNN, the APN, the DRB ID, the QFI, the TFT, the Application ID, the UE Route selection policy identifier, the establishment cause, the access type, and the access category.

The secure NAS or AS message may be indicative of details of the incoming request pending at Network 2 of SIM 2. The Network 1 further delivers the secure NAS or AS message to the UE 504. Upon receiving the secure NAS/AS message, the UE 504 may check integrity of the message and then decode contents of the message. The content of the message may include, but is not limited to, a caller number and a type of service request.

Further, based on the predefined priorities, the system 502 may accordingly respond to the incoming request. In an embodiment, if the incoming request is of high priority, the system 502 first terminates (or suspends) the active session with the Network 1 and then establishes an active connection (or session) with the Network 2. On the other hand, if the incoming request is of low priority, a notification is transmitted to the Network 2 of the SIM 2 indicating that an action is not initiated.

Figure 10:
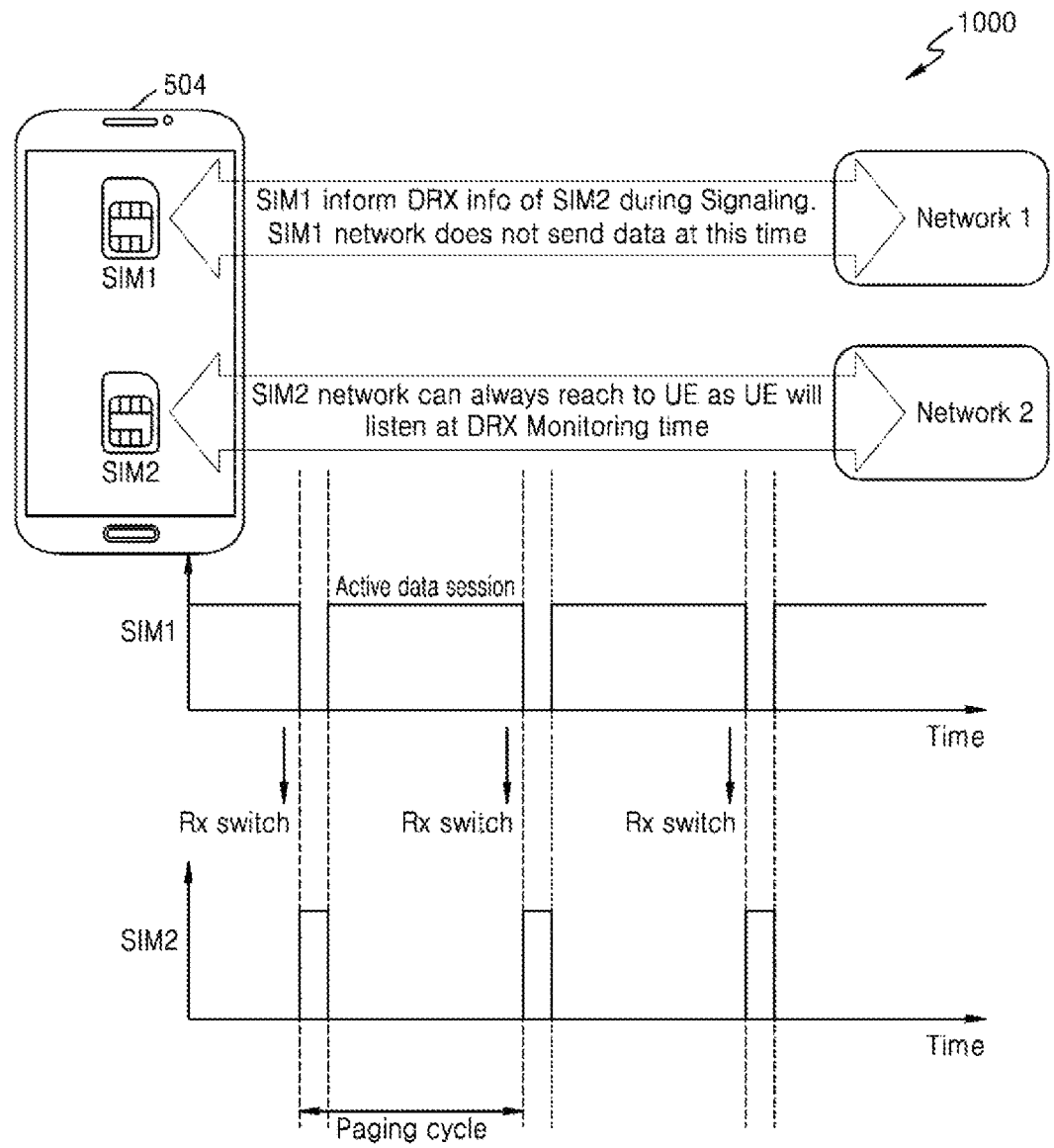
FIG. 10 illustrates a block diagram depicting handling of incoming requests, according to an embodiment of the present disclosure.

FIG. 10 illustrates a block diagram 1000 depicting handling of incoming requests for the UE 504, according to an embodiment of the present disclosure. In an embodiment, the UE 504 informs Discontinuous Reception (DRX) information of one network to another network. For example, the SIM1 may inform DRX information of the SIM2 network to the SIM1 network through RRC/NAS signaling message.

When the SIM1 is active in a data session, the SIM1 network does not send incoming data in a duration when the UE 504 listens to the SIM2 network in a DRX interval. Further, the SIM1 network may not allocate grant to the UE 504 in the DRX interval of the SIM2. The UE 504 may tune-away receive to the SIM2 for receiving paging without any data loss on the SIM1 Network.

Figure 11:
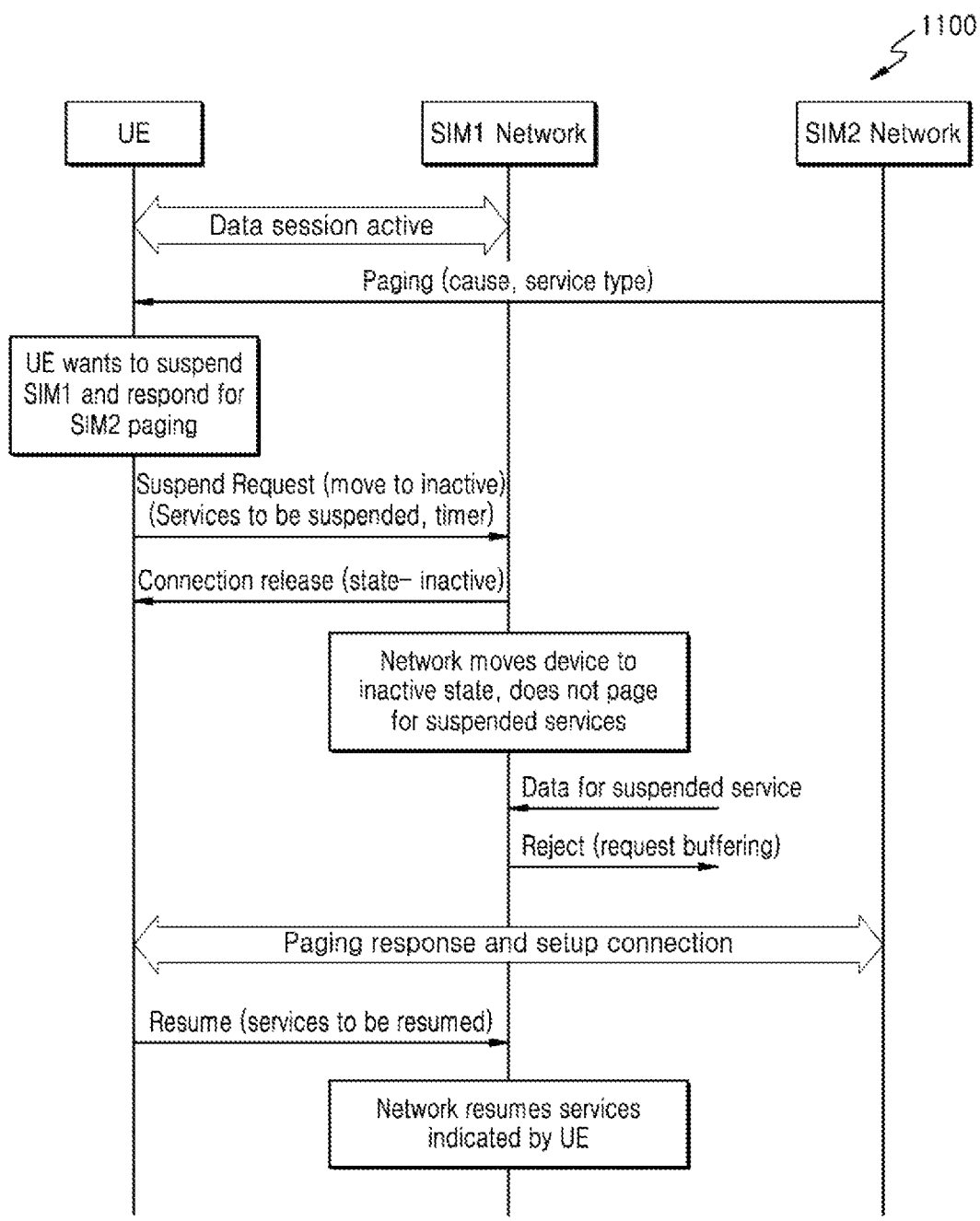
FIG. 11 illustrates a call flow diagram depicting handling of incoming requests, according to another embodiment of the present disclosure.

FIG. 11 illustrates a call flow diagram 1100 depicting handling of incoming requests for the UE 504, according to another embodiment of the present disclosure. In the present embodiment, a data suspend and resume procedure is followed to handle the incoming requests. In an embodiment, when the SIM1 is active in a data session and the UE 504 receives a SIM2 paging with a cause value through the secure tunnel, the UE 504 may request the SIM1 network to suspend the connection so that the UE may respond to the SIM2 paging for high priority requests. In an embodiment, a suspension request may be sent along with a list of services. The list of services may be indicative of services for which the network may page to the UE 504 in the suspended state.

In an embodiment, the UE 504 may also include a timer value for required suspended duration. In the suspension request, the UE 504 may also indicate if the UE 504 wants to enter an inactive state or release the connection. After receiving the suspension indication, the network releases the connection, and may then move the UE 504 to an inactive state. The network keeps UE context for fast connection resume.

Upon receiving any incoming request for paging, the network checks if the UE 504 wants to receive the paging or not. If the paging cause is allowed by the UE 504, the network may then page to the UE 504. In an alternate embodiment, when the paging cause value is not allowed by the UE 504, then the network informs a requesting node to buffer the data for some duration.

Figure 12:
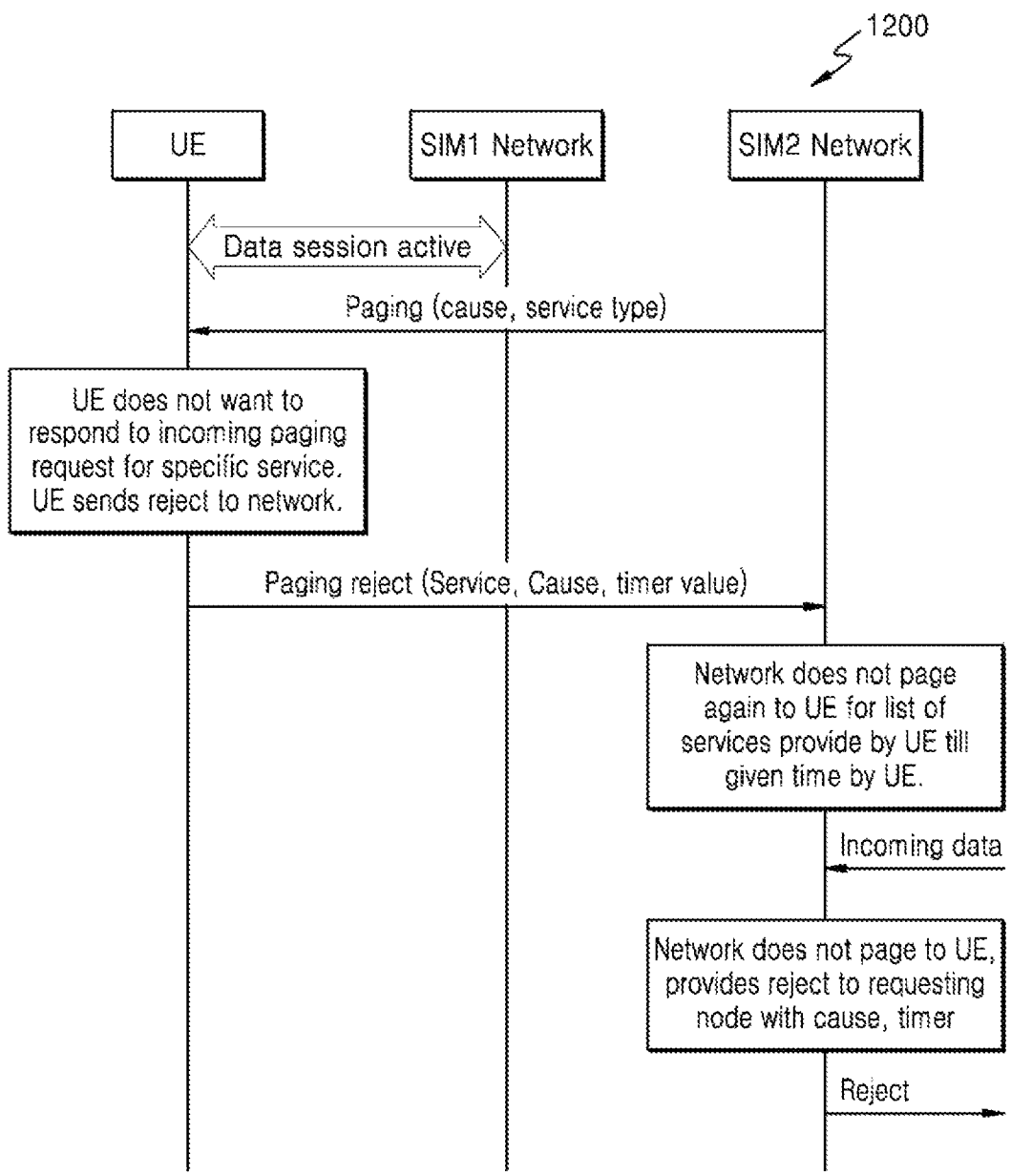
FIG. 12 illustrates a call flow diagram depicting handling of paging requests for unwanted services, according to an embodiment of the present disclosure.

FIG. 12 illustrates a call flow diagram 1200 depicting handling of paging requests for unwanted services, according to an embodiment of the present disclosure. In an embodiment, when the UE 504 receives paging with a cause value, for example, service type, the UE 504 checks for on-going services in the other SIM. If the UE 504 is unable to respond to paging, the UE 504 sends a paging reject message to the network. In the paging request message, the UE 504 may include, but is not limited to, a reject cause value, a timer value, and a list of services for which the UE 504 wants to receive paging. Alternatively, the UE 504 may include, but is not limited to, a list of paging cause/services for which the UE 504 does not want to receive the paging.

Figure 13:
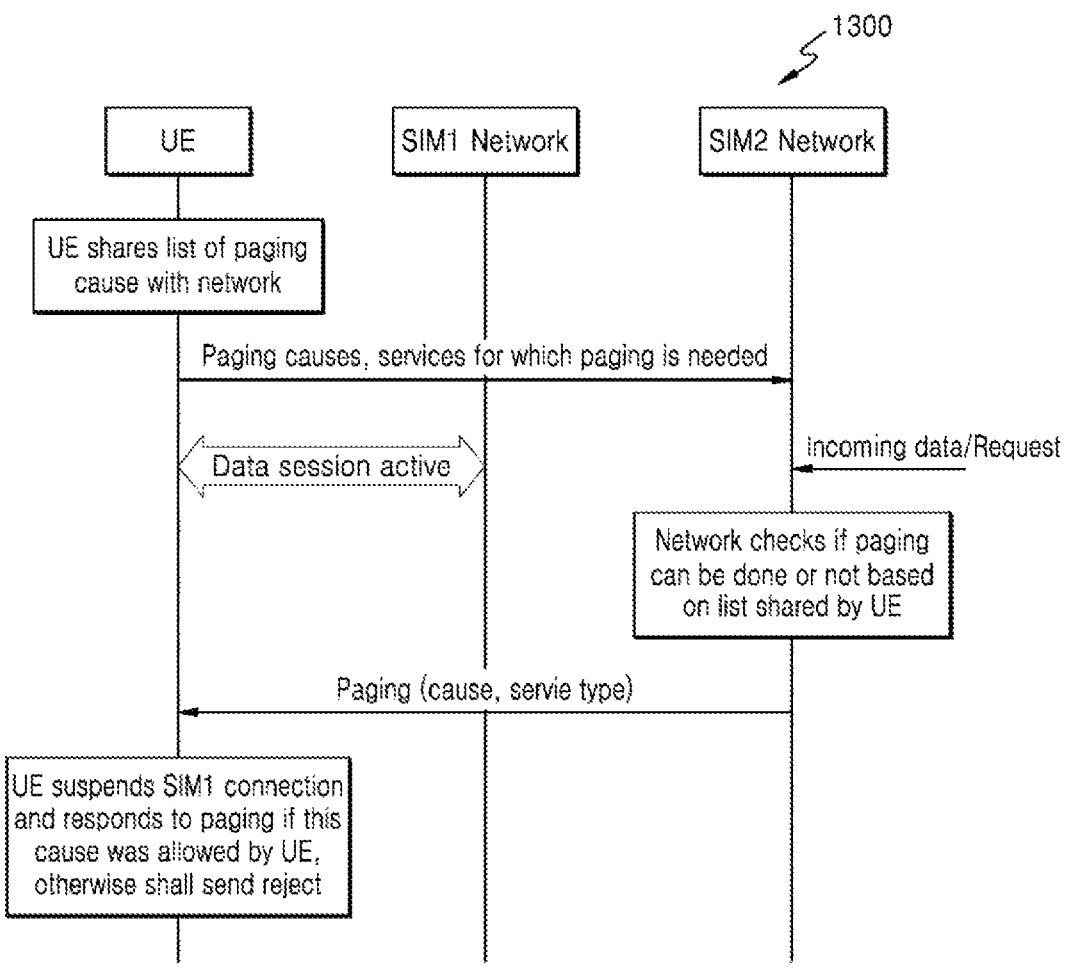
FIG. 13 illustrates a call flow diagram depicting paging cause negotiation with the network, according to an embodiment of the present disclosure.

FIG. 13 illustrates a call flow diagram 1300 depicting paging cause negotiation with the network, according to an embodiment of the present disclosure. In an embodiment, the UE 504 may negotiate or inform about a list of paging causes for which the UE 504 wants to receive the paging. Thereafter, the network may page the UE 504 only when the paging is being received with allowed cause value by the UE 504. If the paging cause is not allowed by the UE 504, the network does not page the UE 504. In such an embodiment, the network may send reject to the requesting node as the network is unable to page the UE 504. The requesting node may then buffer the data and retry after sometime.

The UE 504 may negotiate paging causes along with the timer value for which the paging is allowed, and paging causes along with the timer value for which the paging is not allowed. The UE 504 may negotiate the paging cause value or service types with the network. Such negotiation assists the network in saving resources for unwanted paging.

Figure 14:
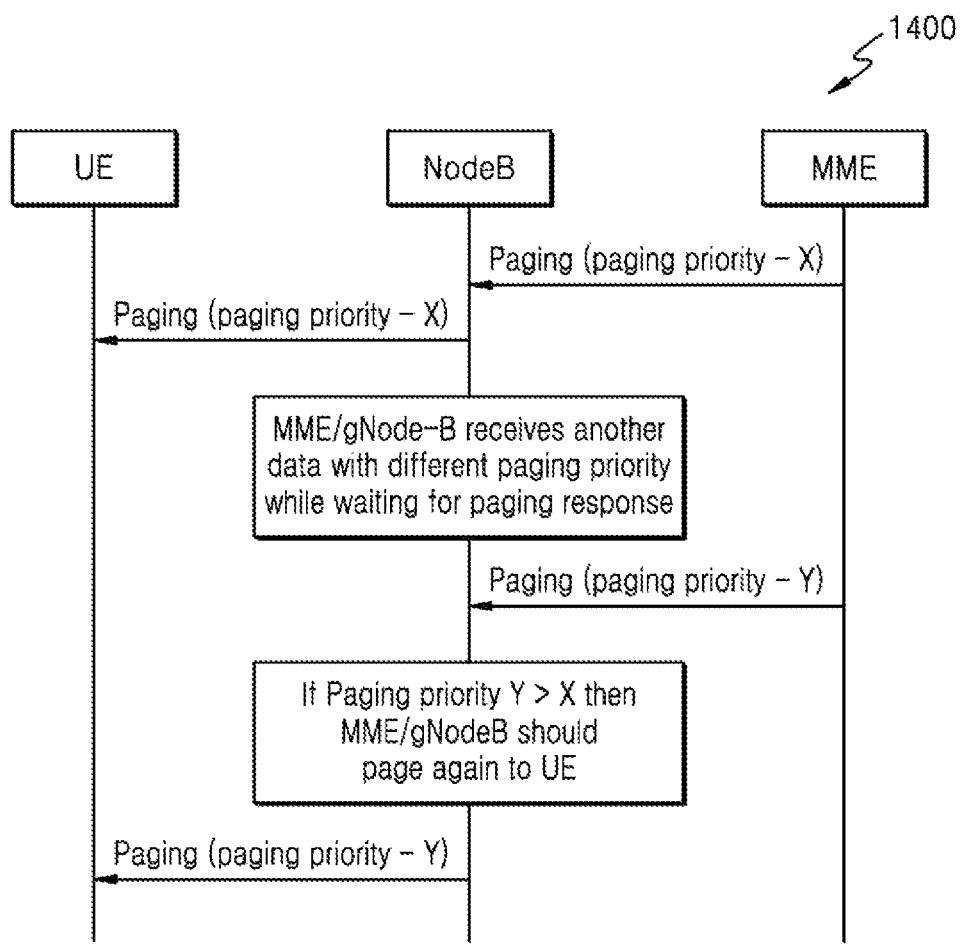
FIG. 14 illustrates a call flow diagram depicting handling of paging requests having different priorities, according to an embodiment of the present disclosure.

FIG. 14 illustrates a call flow diagram 1400 depicting handling of high priority paging request for the UE 504, according to an embodiment of the present disclosure. In an embodiment, if the MME, while waiting for a UE response to the paging request message sent with paging priority indication, receives another downlink data notification with high paging priority, then the MME shall abort on-going paging. The MME may then send new paging indication to Radio Access Network (RAN) node with high priority paging indicator. The RAN node may abort the on-going paging, and may then send new paging to the UE 504 with updated paging cause/Priority. However, if the data or signalling for lower priority paging cause is received at g-NodeB or the MME, the respective node may continue to page the UE 504 with existing paging cause.

Further, in an embodiment, when the UE 504 decides to use a priority service, for example, a priority x, on the SIM-1, then the UE 504 may indicate to the SIM-2 network that it shall suspend the services. The UE 504 may also indicate the priority of service being used by the UE 504 on the SIM-1, to the SIM-2 network so that the SIM-2 network may continue to page the UE 504 for any service which is of higher priority when compared to the service with priority x. However, the UE 504 may start blocking the services which are of lower priority than the priority x. Further, the SIM-2 network may continue with the above-mentioned behaviour till a resume procedure is executed or re-negotiation of priority service is executed between the UE 504 and the network.

Figure 15:
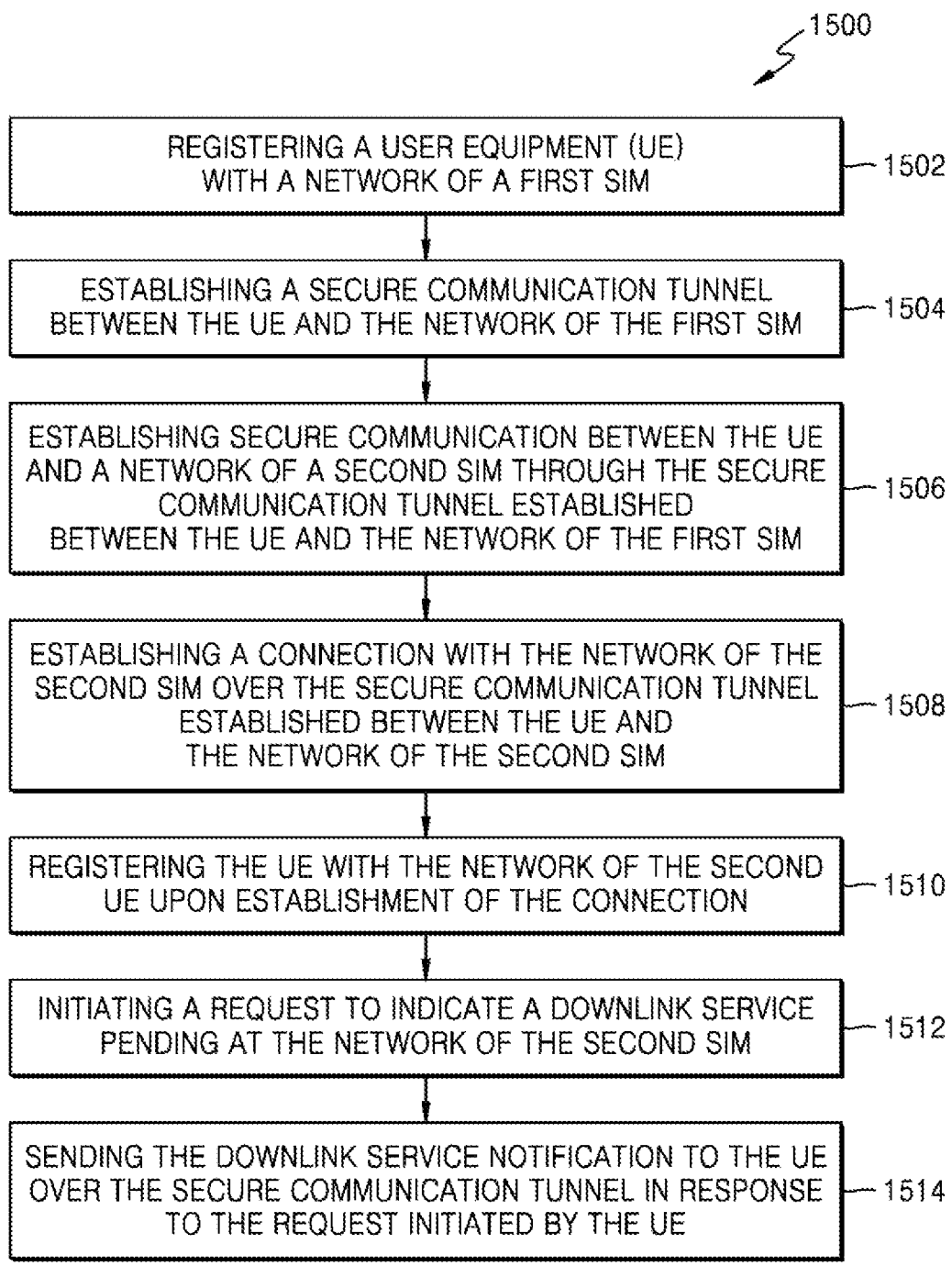
FIG. 15 illustrates a flow chart depicting a method of communication in the multi-SIM enabled UE, according to an embodiment of the present disclosure.

FIG. 15 illustrates a flow chart depicting a method 1500 of communication in the multi-SIM enabled UE 504, according to an embodiment of the present disclosure. In an embodiment, the method 1500 may be a computer-implemented method 1500. In an embodiment, the method 1500 may be executed by the processor 602. Further, for the sake of brevity, features of the present disclosure that are explained in details in the description of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14 are not explained in detail in the description of FIG. 15.

At a block 1502, the method 1500 includes registering the UE 504 with the network of the first SIM. In an embodiment, the registration module 610 of the system 502 may be configured to register the UE 504 with the network of the first SIM.

At a block 1504, the method 1500 includes establishing the secure communication tunnel between the UE 504 and the network of the first SIM. In an embodiment, the method 1500 may include establishing the PDU session between the UE 504 and the network of the first SIM. In such an embodiment, the method 1500 may further include establishing the secure communication tunnel between the UE 504 and the network of the first SIM through the PDU session. In an embodiment, the PDU session may be established over 3GPP access or non 3GPP access of the network of the first SIM. In an embodiment, the establishing module 612 may be configured to establish the secure communication tunnel between the UE 504 and the network of the first SIM.

At a block 1506, the method 1500 includes establishing the secure communication between the UE 504 and the network of the second SIM through the secure communication tunnel established between the UE 504 and the network of the first SIM. In an embodiment, the method 1500 may include establishing the secure communication between the UE 504 and the network of the second SIM through one of the ePDG and the N3IWF. The ePDG or the N3IWF of the second network may be connected to the secure communication tunnel established between the UE 504 and the network of the first SIM. In an embodiment, the establishing module 612 may be configured to establish the secure communication tunnel between the UE 504 and the network of the second SIM.

At a block 1508, the method 1500 includes establishing the connection with the network of the second SIM over the secure communication established between the UE 504 and the network of the second SIM. In an embodiment, establishing module 612 may be configured to establish the connection between the UE 504 and the network of the second SIM.

At a block 1510, the method 1500 includes registering the UE 504 with the network of the second SIM, upon establishment of the connection between the UE 504 and the network of the second SIM. In an embodiment, the registering module 610 may register the UE 504 with the network of the second SIM.

At a block 1512, the method 1500 includes initiating the request to the network of second SIM by the UE 504 to indicate the downlink service pending at the network of the second SIM to the UE 504, over the established secure communication tunnel between the UE 504 and second SIM. This indication is important because the service is executed over the 3GPP access of the second SIM, i.e., the PDU session of that specific service is established over the 3GPP access. However, in order to initiate that service, an indication is received to the UE 504 over the established secure communication tunnel.

At a block 1514, the method 1500 includes sending the downlink service notification to the UE over the secure communication tunnel in response to the request initiated by the UE 504. The UE 504 is able to receive the downlink service notification for the second SIM network over the first SIM network, thereby avoiding the requirement for the UE 504 to read the paging channel of the second SIM network, as the second SIM network may not broadcast paging message to the UE 504 in its own Radio Access Network (RAN) network. In an embodiment, the requesting module 614 may initiate the request to indicate the pending downlink service. The request to indicate the pending downlink service is sent over the secured communication tunnel established between UE 504 and the network of the second SIM, which may also be included in the registration request message sent to the network of the second SIM.

In an embodiment, the method 1500 may include receiving the NAS message over the network of the first SIM. The NAS message may be indicative of the downlink service pending at the network of the second SIM. The NAS message may be received over the secure communication between the UE 504 and the network of the second SIM.

Figure 16:
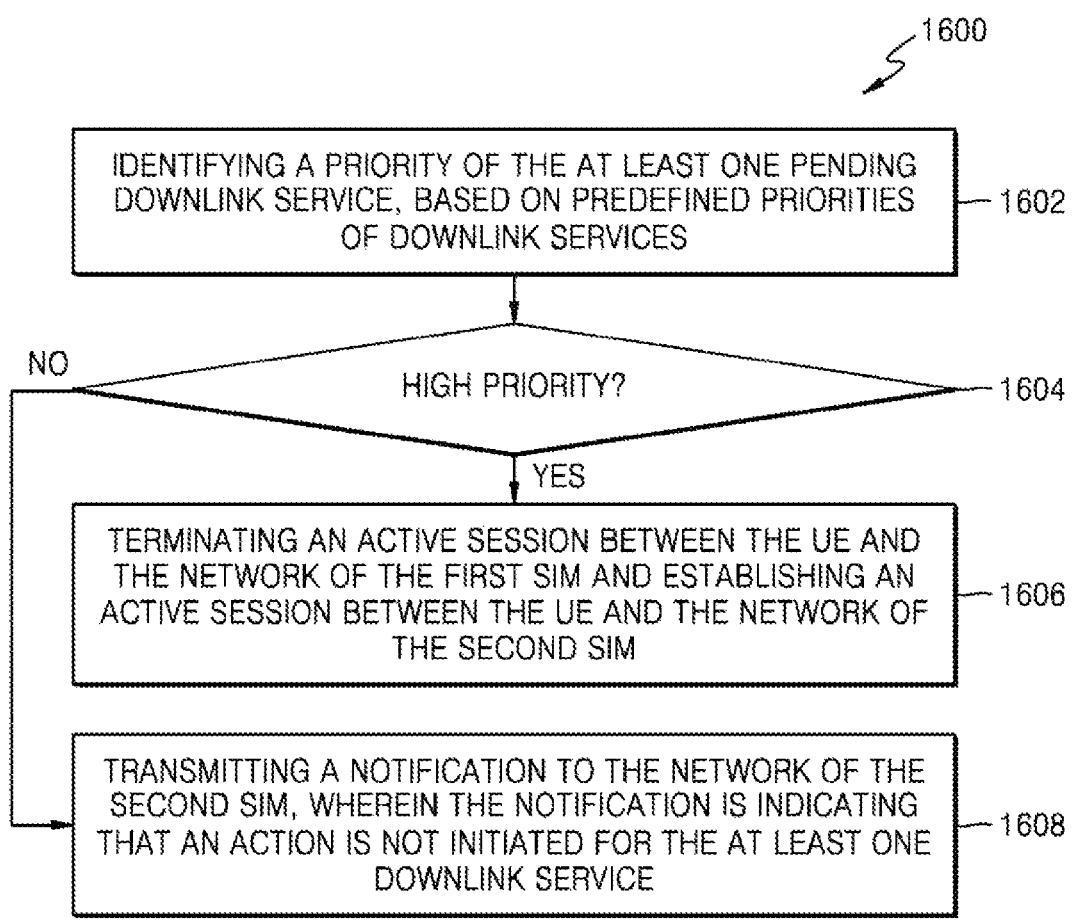
FIG. 16 illustrates a flow chart depicting a method of communication with networks of SIMS depending on priorities of pending downlink services, according to an embodiment of the present disclosure.

FIG. 16 illustrates a flow chart depicting a method 1600 of communication with networks of SIMS depending on priorities of pending downlink services, according to an embodiment of the present disclosure. In an embodiment, the method 1600 may be a computer-implemented method 1600. In an embodiment, the method 1600 may be executed by the processor 602. Further, for the sake of brevity, features of the present disclosure that are explained in details in the description of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15 are not explained in detail in the description of FIG. 16.

At a block 1602, the method 1600 includes identifying a priority of the pending downlink service, based on predefined priorities of the downlink services. The downlink service can be indicated at least by one of the PDU session identifier (ID), the slice ID, the QOS, the QCI, the paging cause, the service type, the EPS bearer ID, the DNN, the APN, the DRB ID, the QFI, the TFT, the Application ID, the UE Route selection policy identifier, the establishment cause, the access type, and the access category. In an embodiment, the identifying module 618 may identify the priority of the pending downlink service.

Further, the method 1600 includes executing an action based on the identified priority of the pending downlink service. At a block 1604, the method 1600 includes determining whether the pending downlink service is of high priority. In an embodiment, when it is determined that the pending downlink service is of high priority, the method 1600 branches to a block 1606. In an embodiment, the establishing module 612 may determine whether the pending downlink service is of the high priority.

At the block 1606, the method 1600 includes terminating the active session between the UE 504 and the network of the first SIM and establishing an active session between the UE 504 and the network of the second SIM. The active session between the UE 504 and the network of the second SIM is established by executing a NAS procedure over the second SIM network, for example, a service request procedure or a registration request procedure. In an embodiment, the establishing module 612 may terminate the active session with the network of the first UE and establish an active session with the network of the second SIM.

Referring back to the block 1604, in an alternate embodiment, when it is determined that the pending downlink service is of low priority, the method 1600 branches to a block 1608. At the block 1608, the method 1600 includes transmitting a notification to the network of the second SIM. The notification is indicating that an action is not initiated for the downlink service, since the downlink service is of low priority. In an embodiment, the establishing module 612 may transmit the notification to the network of the second SIM.

Figure 17:
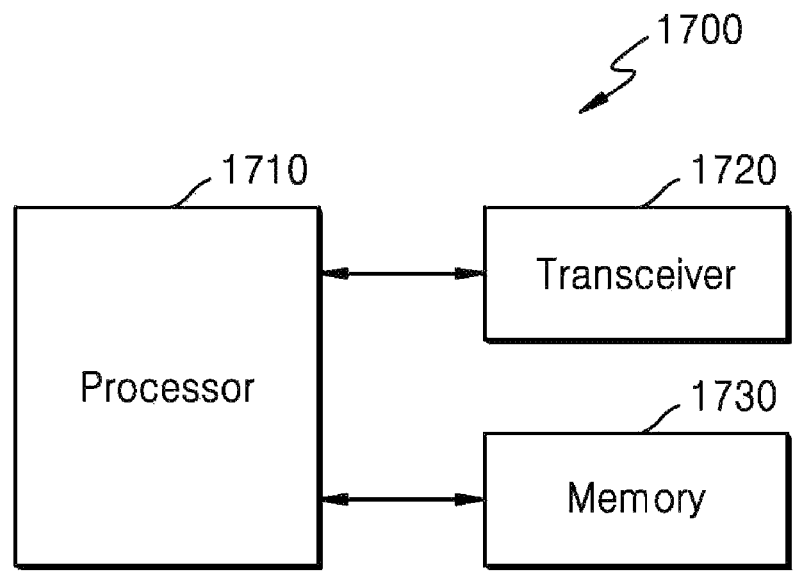
FIG. 17 illustrates a block diagram of a User Equipment (UE), according to an embodiment of the present disclosure.

FIG. 17 illustrates a block diagram of a User Equipment (UE), according to an embodiment of the present disclosure. In an embodiment, the UE 504 may be implemented as UE 1700 in FIG. 17.

Referring to the FIG. 17, the UE 1700 may include a processor 1710, a transceiver 1720 and a memory 1730. However, all of the illustrated components are not essential. The user equipment 1700 may be implemented by more or less components than those illustrated in FIG. 17. In addition, the processor 1710 and the transceiver 1720 and the memory 1730 may be implemented as a single chip according to another embodiment.

The aforementioned components will now be described in detail.

The processor 1710 may include one or more processors or other processing devices that control the proposed function, process, and/or method. Operation of the UE 1700 may be implemented by the processor 1710.

The transceiver 1720 may include a RF transmitter for up-converting and amplifying a transmitted signal, and a RF receiver for down-converting a frequency of a received signal. However, according to another embodiment, the transceiver 1720 may be implemented by more or less components than those illustrated in components.

The transceiver 1720 may be connected to the processor 1710 and transmit and/or receive a signal. The signal may include control information and data. In addition, the transceiver 1720 may receive the signal through a wireless channel and output the signal to the processor 1710. The transceiver 1720 may transmit a signal output from the processor 1710 through the wireless channel.

The memory 1730 may store the control information or the data included in a signal obtained by the device 1700. The memory 1730 may be connected to the processor 1710 and store at least one instruction or a protocol or a parameter for the proposed function, process, and/or method. The memory 1730 may include read-only memory (ROM) and/or random access memory (RAM) and/or hard disk and/or CD-ROM and/or DVD and/or other storage devices.

Figure 18:
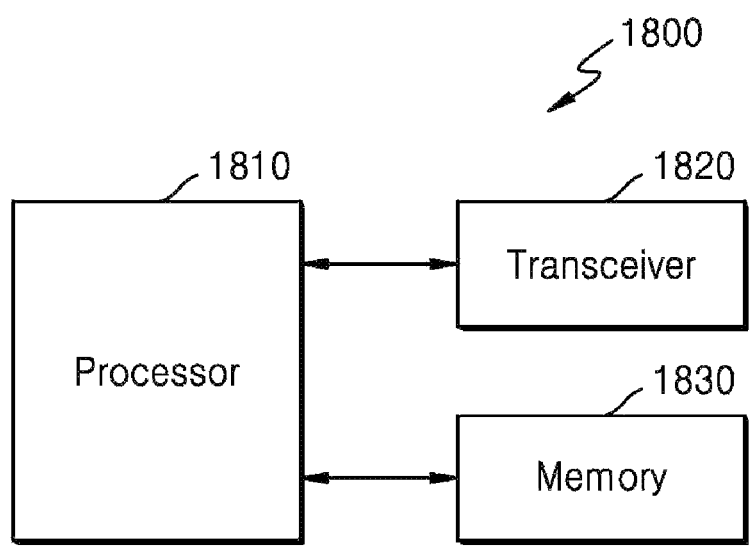
FIG. 18 illustrates a block diagram of a base station, according to an embodiment of the present disclosure.

FIG. 18 illustrates a block diagram of a base station, according to an embodiment of the present disclosure. In an embodiment, the base station 1800 may be a base station of at least one of the first network, the second network, RAN node described above in the disclosure.

Referring to the FIG. 18, the base station 1800 may include a processor 1810, a transceiver 1820 and a memory 1830. However, all of the illustrated components are not essential. The user equipment 1800 may be implemented by more or less components than those illustrated in FIG. 18. In addition, the processor 1810 and the transceiver 1820 and the memory 1830 may be implemented as a single chip according to another embodiment.

The aforementioned components will now be described in detail.

The processor 1810 may include one or more processors or other processing devices that control the proposed function, process, and/or method. Operation of the base station 1800 may be implemented by the processor 1810.

The transceiver 1820 may include a RF transmitter for up-converting and amplifying a transmitted signal, and a RF receiver for down-converting a frequency of a received signal. However, according to another embodiment, the transceiver 1820 may be implemented by more or less components than those illustrated in components.

The transceiver 1820 may be connected to the processor 1810 and transmit and/or receive a signal. The signal may include control information and data. In addition, the transceiver 1820 may receive the signal through a wireless channel and output the signal to the processor 1810. The transceiver 1820 may transmit a signal output from the processor 1810 through the wireless channel.

The memory 1830 may store the control information or the data included in a signal obtained by the device 1800. The memory 1830 may be connected to the processor 1810 and store at least one instruction or a protocol or a parameter for the proposed function, process, and/or method. The memory 1830 may include read-only memory (ROM) and/or random access memory (RAM) and/or hard disk and/or CD-ROM and/or DVD and/or other storage devices.

As would be gathered, the system 502, the method 1500, and the method 1600 offer a comprehensive approach for enhanced communication of the UE 504 having multiple SIMS. First of all, owing to the present approach, the UE 504 does not need to constantly monitor the paging from the network of inactive SIMS. This would negate the possibility of unnecessary consumption of the available resources.

Further, the possibility of any data loss during the operation of the UE through the network of the active SIM is eliminated. Moreover, unnecessary consumption of the battery charge due to undesired interruption of continuous monitoring of multiple networks is also avoided. Consequently, the operational performance of the network of the active SIM is enhanced while simultaneously ensuring a satisfactory user experience.

In addition, the proposed approach ensures that the UE receives the notification of the downlink services pending at the network of the inactive SIMS based on the designated priorities. Therefore, an intelligent switching of the networks is facilitated. Therefore, the present disclosure offers a comprehensive approach for enhanced communication in the multi-SIM UE 504 that is effective, priority-based, accurate, cost-effective, and ensures optimum utilization of the resources.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method of a multi-Subscriber Identity Module (SIM) enabled User Equipment (UE), the method comprising:
   registering the UE with a network of a first SIM;
   establishing a secure communication tunnel between the UE and the network of the first SIM;
   establishing a connection between the UE and a network of a second SIM through the secure communication tunnel established between the UE and the network of the first SIM and through one of an evolved Packet Data Gateway (ePDG) and a Non-3GPP Inter-Working Function (N3IWF);
   registering the UE with the network of the second SIM over the connection established between the UE and the network of the second SIM; and
   receiving a message indicating downlink data pending at the network of the second SIM, over the secure communication tunnel between the UE and the network of the first SIM.

2. The method of claim 1, wherein the ePDG or the N3IWF of the network of the second SIM is connected to the secure communication tunnel established between the UE and the network of the first SIM.

3. The method of claim 1, wherein the message is a Non-Access Stratum (NAS) message.

4. The method of claim 1, further comprising:
   identifying a priority of the pending downlink data; and
   executing an action based on the identified priority of the pending downlink data, wherein the action comprises:
   terminating an active session between the UE and the network of the first SIM and establishing an active session between the UE and the network of the second SIM, in case that the pending downlink data is of high priority; and
   transmitting a notification to the network of the second SIM, in case that the pending downlink data is of low priority, wherein the notification indicates that an action is not initiated for the pending downlink data.

5. The method of claim 1, wherein the secure communication tunnel between the UE and the network of the first SIM is established through a Protocol Data Unit (PDU) session established between the UE and the network of the first SIM.

6. The method of claim 1, further comprising:
   terminating an active session between the UE and the network of the first SIM and establishing an active session between the UE and the network of the second SIM, based on receiving the message.

7. A system in a multi-Subscriber Identity Module (SIM) enabled User Equipment (UE), the system comprising:
   a registering module configured to register the UE with a network of a first SIM;
   an establishing module in communication with the registering module and configured to establish a secure communication tunnel between the UE and the network of the first SIM and to establish a connection between the UE and a network of a second SIM through the secure communication tunnel established between the UE and the network of the first SIM and through one of an evolved Packet Data Gateway (ePDG) and a Non-3GPP Inter-Working Function (N3IWF);
   the registering module in communication with the establishing module, and further configured to register the UE with the network of the second SIM over the connection established between the UE and the network of the second SIM; and
   a receiving module in communication with the establishing module and the registering module, and configured to receive a message indicating downlink data pending at the network of the second SIM, over the secure communication tunnel between the UE and the network of the first SIM.

8. The system of claim 7, wherein the ePDG or the N3IWF of the network of the second SIM is connected to the secure communication tunnel established between the UE and the network of the first SIM.

9. The system of claim 7, wherein the message is a Non-Access Stratum (NAS) message.

10. The system of claim 7, further comprising:
    an identifying module in communication with the receiving module and configured to identify a priority of the pending downlink data,
    wherein the establishing module is further configured to execute an action based on the identified priority of the pending downlink data, wherein the action comprises:
    terminating an active session between the UE and the network of the first SIM and establishing an active session between the UE and the network of the second SIM, in case that the pending downlink data is of high priority; and
    transmitting a notification to the network of the second SIM, in case that the pending downlink data is of low priority, wherein the notification indicates that an action is not initiated for the pending downlink data.

11. The system of claim 7, wherein the secure communication tunnel between the UE and the network of the first SIM is established through a Protocol Data Unit (PDU) session established between the UE and the network of the first SIM.

12. The system of claim 7, wherein the receiving module is further configured to:
    terminate an active session between the UE and the network of the first SIM and establish an active session between the UE and the network of the second SIM, based on receiving the message.

13. A multi-Subscriber Identity Module (SIM) enabled User Equipment (UE), the UE comprising:
    a first stack configured to accommodate a first SIM;
    a second stack configured to accommodate a second SIM; and
    a system in communication with the first SIM and the second SIM, and the system is configured to:
    register the UE with a network of the first SIM;
    establish a secure communication tunnel between the UE and the network of the first SIM;
    establish a connection between the UE and a network of the second SIM through the secure communication tunnel established between the UE and the network of the first SIM and through one of an evolved Packet Data Gateway (ePDG) and a Non-3GPP Inter-Working Function (N3IWF);
    register the UE with the network of the second SIM over the connection established between the UE and the network of the second SIM; and
    receive a message indicating downlink data pending at the network of the second SIM, over the secure communication tunnel between the UE and the network of the first SIM.

14. The UE of claim 13, wherein the ePDG or the N3IWF of the network of the second SIM is connected to the secure communication tunnel established between the UE and the network of the first SIM.

15. The UE of claim 13, wherein the message is a Non-Access Stratum (NAS) message.

16. The UE of claim 13, wherein the system is further configured to:
   identify a priority of the pending downlink data; and
   execute an action based on the identified priority of the pending downlink data, wherein the action comprises:
   terminating an active session between the UE and the network of the first SIM and establishing an active session between the UE and the network of the second SIM, in case that the pending downlink data is of high priority; and
   transmitting a notification to the network of the second SIM, in case that the pending downlink data is of low priority, wherein the notification indicates that an action is not initiated for the pending downlink data.

17. The UE of claim 13, wherein the secure communication tunnel is established between the UE and the network of the first SIM through a Protocol Data Unit (PDU) session established between the UE and the network of the first SIM.

18. The UE of claim 13, wherein the system is further configured to:
   terminate an active session between the UE and the network of the first SIM and establish an active session between the UE and the network of the second SIM, based on receiving the message.

* * * * *